US012376073B2

(12) United States Patent
Wu et al.

(10) Patent No.: US 12,376,073 B2
(45) Date of Patent: Jul. 29, 2025

(54) METHOD AND APPARATUS FOR HANDLING PAGING COLLISIONS

(71) Applicant: LENOVO (BEIJING) LIMITED, Beijing (CN)

(72) Inventors: Lianhai Wu, Beijing (CN); Tingfang Tang, Beijing (CN); Zhi Yan, Beijing (CN); Jing Han, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 446 days.

(21) Appl. No.: 17/613,871

(22) PCT Filed: Jun. 5, 2019

(86) PCT No.: PCT/CN2019/090203
§ 371 (c)(1),
(2) Date: Nov. 23, 2021

(87) PCT Pub. No.: WO2020/243932
PCT Pub. Date: Dec. 10, 2020

(65) Prior Publication Data
US 2022/0248369 A1    Aug. 4, 2022

(51) Int. Cl.
*H04W 68/02*    (2009.01)
*H04W 24/08*    (2009.01)
*H04W 68/00*    (2009.01)

(52) U.S. Cl.
CPC .......... *H04W 68/02* (2013.01); *H04W 24/08* (2013.01); *H04W 68/005* (2013.01)

(58) Field of Classification Search
None
See application file for complete search history.

(56) References Cited

U.S. PATENT DOCUMENTS

| 10,178,648 | B2 | 1/2019 | Balasubramanian et al. |
| 2015/0050952 | A1* | 2/2015 | Ponukumati .......... H04W 68/02 455/458 |
| 2020/0396714 | A1* | 12/2020 | Lee .................. H04W 52/0229 |

FOREIGN PATENT DOCUMENTS

| CN | 101179796 | A |   | 5/2008 |   |
| CN | 101951653 | A |   | 1/2011 |   |
| CN | 106470481 |   | * | 3/2017 | ............ H04W 68/02 |
| CN | 106470481 | A | * | 3/2017 | ............ H04W 68/02 |

OTHER PUBLICATIONS

International Searching Authority, "Written Opinion of the International Searching Authority," PCT/CN2019/090203, Feb. 28, 2020, pp. 1-4.
Qualcomm Incorporated, Oppo, China UNICOM, Vivo, Avoidance of paging collisions to minimize outage of services, SA WG2 Meeting #122, S2-174243, Jun. 26-30, 2017, pp. 1-8, San Jose Del Cabo, Mexico.

* cited by examiner

*Primary Examiner* — Gary Lafontant
(74) *Attorney, Agent, or Firm* — Kunzler Bean & Adamson

(57) ABSTRACT

The present disclosure relates to methods and apparatuses. According to some embodiments of the disclosure, a method includes: transmitting, from a communication device, a message indicating a paging collision; and receiving, at the communication device, configuration information in response to the message indicating the paging collision.

16 Claims, 5 Drawing Sheets

METHOD AND APPARATUS FOR HANDLING PAGING COLLISIONS

TECHNICAL FIELD

The present disclosure generally relates to wireless communication technology, and more particularly to paging control in a wireless communication system.

BACKGROUND

A wireless communication device (e.g., a cell phone, a tablet, a laptop, an internet-of-things (IoT) device, etc.), which may include two or more Subscriber Identity Modules (SIMs), can be referred to as a multi-SIM wireless communication device.

Generally, a SIM may correspond to at least one subscription in an environment where Radio Access Technology (RAT) is adopted. For example, a multi-SIM wireless communication device may have a first SIM associated with a first subscription and a second SIM associated with a second subscription. The first SIM and the second SIM can share the same hardware component(s), e.g., Radio Frequency (RF) component(s) or baseband component(s).

During a specific time period, a multi-SIM wireless communication device with a single Transmit/Receive (TX/RX) chain may monitor only a single wireless network. Each SIM associated with the multi-SIM wireless communication device may be configured to listen to paging messages on a Radio Access Network (RAN) during a paging occasion. However, if two paging occasions overlap or the arrival time thereof is relatively close, the multi-SIM wireless communication device may only monitor one paging occasion and miss the other paging occasion. Such phenomenon may be referred to as paging collision.

Therefore, a solution is required to handle paging collision on multiple wireless communication networks accessed by a multi-SIM wireless communication device.

SUMMARY OF THE DISCLOSURE

Some embodiments of the present disclosure provide a method, including: transmitting, from a communication device, a message indicating a paging collision; and receiving, at the communication device, configuration information in response to the message indicating the paging collision.

Another embodiment of the present disclosure provides a method, including: receiving a message indicating a paging collision at a communication device; and transmitting configuration information in response to the message indicating the paging collision.

Yet another embodiment of the present disclosure provides a method, including: receiving a message indicating a paging collision at a communication device.

Yet another embodiment of the present disclosure provides an apparatus. According to some embodiments of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1:
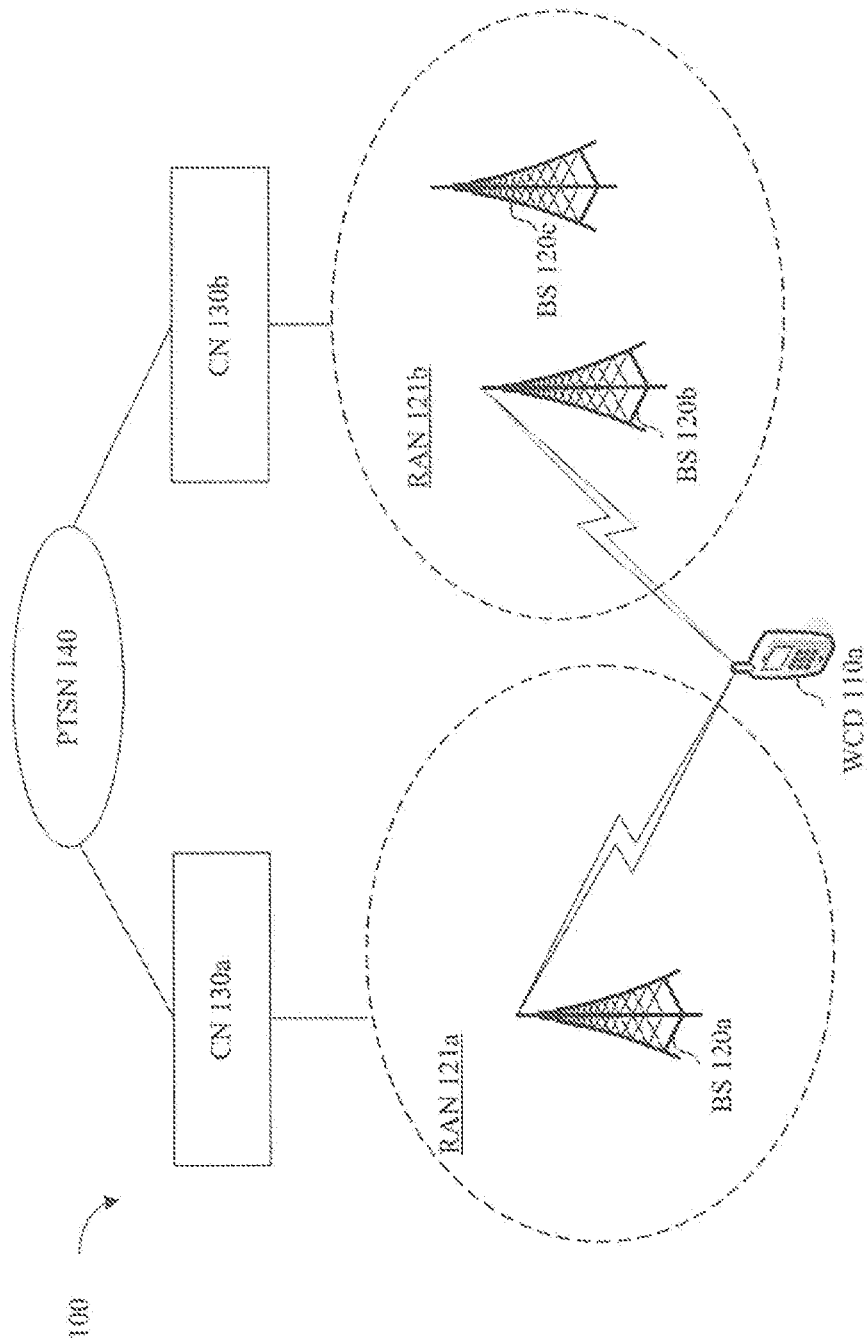
FIG. 1 illustrates a schematic wireless communication system according to some embodiments of the present disclosure.

FIG. 1 illustrates a wireless communication system 100 according to some embodiments of the present disclosure.

Referring to FIG. 1, a wireless communication system 100 may include some Wireless Communication Devices (WCDs) 110a, some base stations (BSs) 120a, 120b, and 120c, some Radio Access Networks (RANs) 121a and 121b, some Core Networks (CNs) 130a and 130b, and a Public Switched Telephone Network (PSTN) 140. It is contemplated that the wireless communication system 100 may include any number of wireless communication devices, BSs, networks, and/or network components.

Each of the BS 120a, BS 120b, and BS 120c may be any type of device configured to wirelessly interface with at least one WCD (e.g., WCD 110a) to facilitate access to one or more communication networks, such as the CN 130a and/or CN 130b. Each of the BS 120a, BS 120b, and BS 120c may operate, for example based on a standard protocol such as Long-Term Evolution (LTE), LTE-Advanced (LTE-A), New Radio (NR), or other suitable protocol(s). For example, the BS 120a, BS 120b, and BS 120c may include an eNB or a gNB. Persons skilled in the art should understand that as the 3GPP (3rd Generation Partnership Project) and communication technology develop, the terminologies recited in the specification may change, which should not affect the principle of the disclosure.

BS 120a may be part of RAN 121a, which may also include other BSs and/or network elements (not shown), such as a Base Station Controller (BSC), a Radio Network Controller (RNC), relay nodes, etc. Also, BS 120b and BS 120c may be part of RAN 121b that in addition, may also include other BSs and/or network elements (not shown in FIG. 1). Each of the BS 120a, BS 120b, and BS 120c may be configured to transmit and/or receive wireless signals within a particular geographic region, which may be referred to as a cell (not shown in FIG. 1).

RAN 121a may be in communication with the CN 130a, and the RAN 121b may be in communication with the CN 130b. The RAN 121a and the RAN 121b may employ the same or different Radio Access Technologies (RATs). For example, RAN 121a may employ an Evolved Universal Terrestrial Radio Access Network (E-UTRAN) radio technology, and the RAN 121b may employ a NR radio technology. Each of the CN 130a and CN 130b may include a plurality of core network components, such as a Mobility Management Entity (MME) (not shown in FIG. 1) or an Access and Mobility Management Function (AMF) (not shown in FIG. 1). The CNs may serve as a gateway for the WCDs to access the PTSN 140 and/or other networks (not shown in FIG. 1).

A Wireless Communication Device 110a may be any type of device configured to operate and/or communicate in a wireless environment. By way of example, the WCD 110a may include a User Equipment (UE), a mobile station, a fixed or mobile subscriber unit, a pager, a cellular phone, a personal digital assistant, a smartphone, a laptop, a netbook, a personal computer, a wireless sensor, consumer electronics, a smart watch and the like. Persons skilled in the art should understand that as technology develops and advances, the terminologies described in the present disclosure may change, but should not affect or limit the principles and spirit of the present disclosure.

WCD 110a may include one or more Subscriber Identity Modules (SIMs) that enable it to access one or more separate wireless communication networks. As shown in FIG. 1, the WCD 110a may be configured to access either RAN 121a through BS 120a by virtue of a first SIM (not shown in FIG. 1) in WCD 110a or RAN 121b through the BS 120b by virtue of a second SIM (not shown in FIG. 1) in WCD 110a. While the WCD 110a is shown connected to the RAN 121a and the RAN 121b, in other examples (not shown), the WCD 110a may establish additional network connections using additional RATs.

Each of the first and second SIMs may associate with one kind of wireless communication system. For example, either the first or the second SIM may be represented by a SIM card corresponding to a GSM system, a Universal Subscriber Identity Module (USIM) card corresponding to a UMTS system, a Removable User Identity Module (RUIM) card or a CDMA Subscriber Identity Module (CSIM) card corresponding to the CDMA2000 communication system, a Universal Integrated Circuit Card (UICC) corresponding to 5G (NR) communication system, a wireless network card corresponding to IEEE 802.11x wireless local area network (WLAN), or other suitable modules that can identify the subscribers.

A WCD that includes a plurality of SIMs and connects to two or more networks with two or more SIMs being active at a given time may be a Multi-SIM-Multi-Active (MSMA) communication device. An example MSMA communication device may be a Dual-SIM-Dual-Active (DSDA) communication device, which may include two SIMs. Both SIMs may remain active.

On the other hand, a WCD provided with a plurality of SIMs and connected to two or more networks with one SIM being active at a given time is a Multi-SIM-Multi-Standby (MSMS) communication device. An example of the MSMS communication device may be a Dual-SIM-Dual-Standby (DSDS). A DSDS communication device may include two SIMs, and may use a single radio front-end and baseband to register the communication device to a single (the same) Public Land Mobile Network or to two different PLMNs with the two SIMs, respectively.

In a multi-SIM wireless communication device, e.g. a MSMS communication device, plurality of SIMs may share a common set of Radio Frequency (RF) resources (such as a RF transceiver) of the wireless communication device. However, embodiments described herein may also be applicable to multi-SIM wireless communication devices in which each of the plurality of SIMs is associated with a separate RF resource with one of the plurality of SIMs being active while the rest are deactivated.

For example, a DSDS communication device may support a first subscription service enabled by a first SIM and a second subscription service enabled by a second SIM. Only one of the first or the second subscription services may use RF resources to communicate with the corresponding wireless network at a time. However, a SIM staying at idle mode may still be expected to monitor the paging message. Therefore, it can be possible that at a certain time, both subscription services may need to use the same RF resources to communicate with their respective wireless networks at a same time, in which case, the PO associated with the first and the second subscription services may collide, resulting in a "paging collision."

For example, a paging collision may occur at a multi-SIM wireless communication device when both the first subscription and the second subscription services may try to access an RF transceiver of the multi-SIM wireless communication device to receive their paging messages simultaneously. For example, a paging collision may occur at the multi-SIM wireless communication device when the first subscription service is using the RF transceiver and the second subscription service receives a network paging message. For example, a paging collision may occur if the arrival time of PO associated with the second subscription service is relatively close to the arrival time of PO associated with the first subscription service. In such situation, there may not be a sufficient time to reassign or redirect the RF resources of the wireless communication device from being used by the first subscription service to being used by the second subscription service.

Paging collision may result in failure of receiving or decoding page messages for one or more of the subscription services by the wireless communication device. Hence, a solution is required to handle paging collision on multiple wireless communication networks accessed by the multi-SIM wireless communication device.

Embodiments of the present disclosure propose technical solutions for transmitting a paging collision indication that can facilitate paging collision control in the new generation communication systems, such as a 5G communication system. More details on the embodiments of the present disclosure will be illustrated in the following text in combination with the appended drawings.

A wireless communication network may determine a System Frame Number (SFN) cycle within which the paging message is transmitted to a WCD, e.g., UE. The paging occasions within this SFN cycle may then be defined by the paging configuration information (e.g., defined through parameters referred to as T and nB as specified in 3GPP Technical Specification TS 36.304), which may be transmitted to the UE.

A wireless communication device (e.g., UE) may derive paging frames (PFs) and paging occasions in which the UE is to listen for paging messages based on the paging configuration information. One paging frame may correspond to one radio frame, and may have a length of 10 milliseconds (ms). A paging occasion may have a length of 1 ms. From the network's perspective, one paging cycle may have one or more paging frames and one paging frame may contain one or more paging occasions. The UE needs to monitor one paging occasion per paging cycle.

For example, the UE may calculate the paging frames and paging occasions using the following equations:

$$\text{SFN mod } T = (T \text{ div } N) * (\text{UE\_ID mod } N) \quad \text{Eq (1)}$$

$$i\_s = \text{floor}(\text{UE\_ID}/N) \text{mod } Ns \quad \text{Eq (2)}$$

$$N = \min(T, nB), \text{ defines the number of PFs per DRX cycle} \quad \text{Eq (3)}$$

$$Ns = \max(1, nB/T), \text{ defines the number of POs per PF} \quad \text{Eq (4)}$$

In the above equations, 'SFN' is the system frame number; 'T' is the DRX cycle or paging cycle (represented in frames) of the UE; and N and other parameters are specified in 3GPP TS 36.304. For example, 'N' may be the number of paging frames within the paging cycle of the UE; 'UE_ID' may be the UE identity; 'i_s' may be an index pointing to a pre-defined table defining the corresponding paging occasion; 'nB' may be the number of paging occasions in the paging cycle; and 'Ns' may be the number of paging occasions in the paging frame.

In some embodiments of the present disclosure, 'T' may be the default DRX cycle, e.g., the default paging cycle broadcast in System Information Block 2 (SIB2). In some embodiments of the present disclosure, 'T' may be the minimum of the RAN paging cycle (e.g., configured by the BS), the UE specific paging cycle (e.g., configured by the CN), and the default paging cycle.

In some embodiments of the present disclosure, UE identity may refer to the International Mobile Subscriber Identity (IMSI), and the value of 'UE_ID' may be equal to (IMSI mod 1024). In some embodiments of the present disclosure, the UE identity may refer to the 5G-S-TMSI (Shortened-Temporary Mobile Subscriber Identity), and the value of 'UE_ID' may be equal to (5G-S-TMSI mod 1024).

Figure 2A:
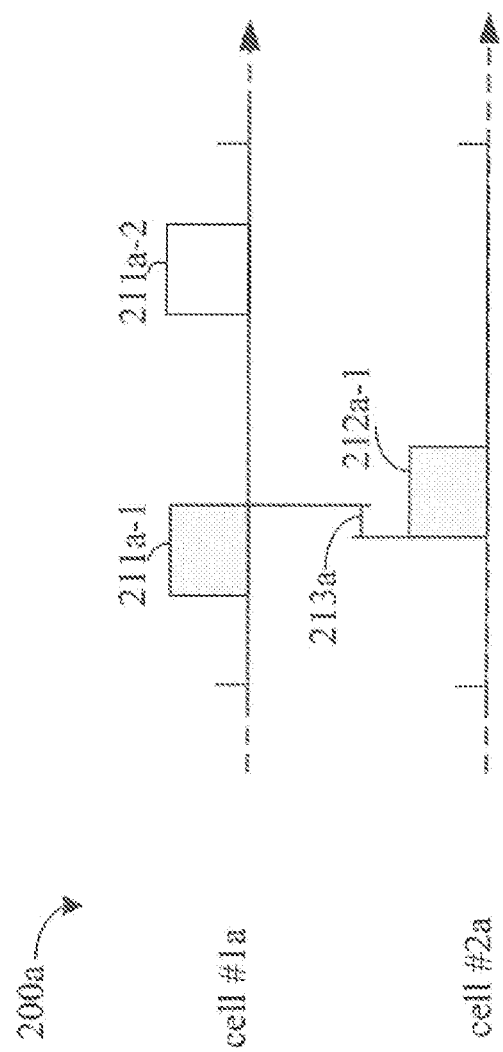
FIG. 2A illustrates an exemplary arrangement of paging occasions according to some embodiments of the present disclosure.
Figure 2B:
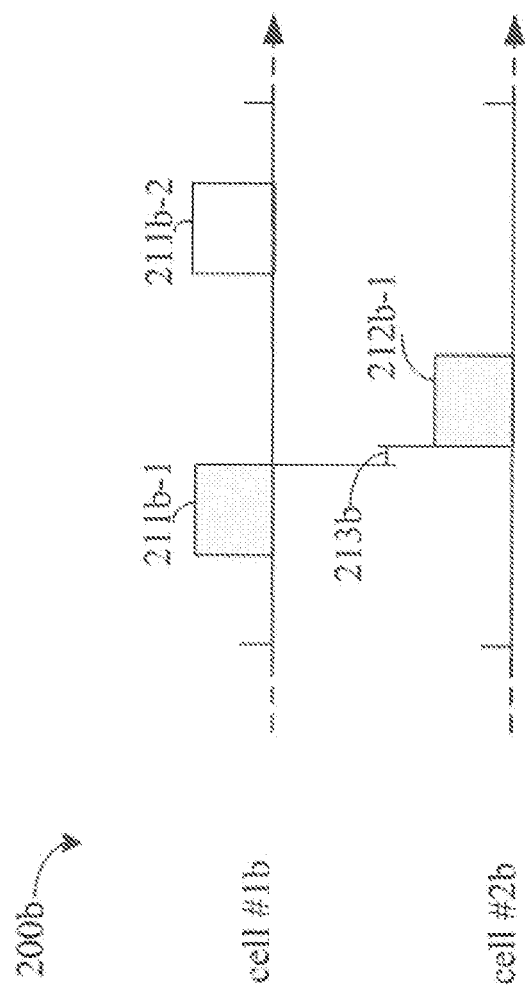
FIG. 2B illustrates an exemplary arrangement of paging occasions according to some embodiments of the present disclosure.

FIGS. 2A and 2B illustrate exemplary arrangements of paging occasions according to some embodiments of the present disclosure.

FIG. 2A shows an exemplary arrangement 200a of transmitted paging occasions over time. Referring to FIG. 2A, cell #1a may transmit paging messages on a paging occasion (or paging subframe) 211a-1 and on a paging occasion 211a-2, whereas cell #2a may transmit paging messages on a paging occasion 212a-1. A UE may listen for a paging message from the cell #1a on the paging occasion 211a-1 and may listen for a paging message from the cell #2a on the paging occasion 212a-1. The UE may include the WCD 110a shown in FIG. 1, and both cells—cell #1a and cell #2a, may include BS 120a and BS 120b shown in FIG. 1, respectively.

As shown in FIG. 2A, the paging occasion 212a-1 overlaps with the paging occasion 211a-1 along time axis (see the arrows as shown in FIG. 2A). In other words, during the period 213a, the paging occasion 212a-1 overlaps the paging occasion 211a-1, and a paging collision may occur at the UE. Although FIG. 2A shows that the paging occasion 212a-1 partially overlaps the paging occasion 211a-1, it is contemplated that the paging occasion 212a-1 may completely overlap the paging occasion 211a-1, timewise.

FIG. 2B shows another exemplary arrangement 200b of transmitted paging occasions over time. Referring to FIG. 2B, a cell #1b may transmit paging messages on a paging occasion 211b-1 and a paging occasion 211b-2, and a cell #2b may transmit paging messages on a paging occasion 212b-1. A UE may listen for a paging message from the cell #1b on the paging occasion 211b-1, and may also listen for a paging message from the cell #2b on the paging occasion 212b-1. The UE may include the WCD 110a shown in FIG. 1, and cells—cell #1b and cell #2b, may include BS 120a and BS 120b, shown in FIG. 1, respectively.

As shown in FIG. 2B, there is a time interval 213b present between the time the paging occasion 211b-1 transmitted and the time the paging occasion 212b-1 begins to transmit. However, a paging collision may still occur at the UE if the time interval 213b is relatively short, for example, it is less than the time it takes by a wireless communication device to reassign, reallocate or redirect the RF resources from supporting the subscription service associated with cell #1b to the subscription service associated with cell #2b.

Figure 3:
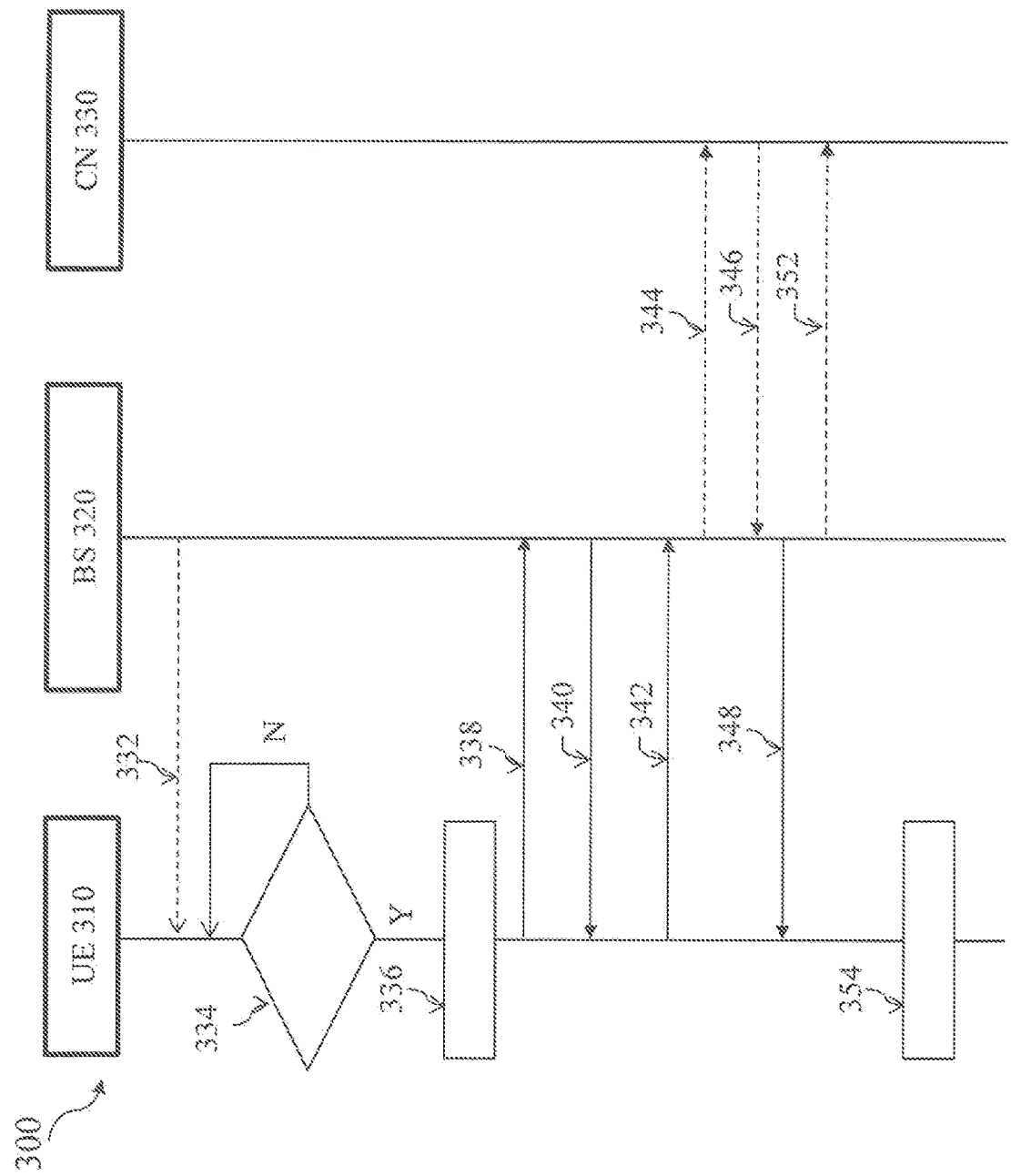
FIG. 3 illustrates a flow chart of an exemplary procedure of handling paging collisions according to some embodiments of the present disclosure.

FIG. 3 illustrates a flow chart of an exemplary procedure 300 for handling paging collisions according to some embodiments of the present disclosure.

In FIG. 3, UE 310 may include a plurality of SIMs which support connection to a number of networks. For example, the UE 310 may be configured to access a first RAN through a first BS (e.g., BS 320) by virtue of a first SIM, and may be configured to access a second RAN through a second BS by virtue of a second SIM. The BS 320 is in communication with CN 330.

The UE 310 may function as the WCD 110a shown in FIG. 1, the BS 320 may function as the BS 120a or the BS 120b shown in FIG. 1, the CN 330 may function as the CN 130a or the CN 130b shown in FIG. 1, and the first RAN may function as the RAN 121a or the RAN 121b shown in FIG. 1. The second BS may function as any other one of BS 120a or BS 120b shown in FIG. 1, and the second RAN may function as the other one of the RAN 121a or the RAN 121b shown in FIG. 1.

In operation 334, UE may determine whether a paging collision occurs at the UE. If it is determined that a paging collision occurs at the UE, the UE may select, in operation 336, one of the two or more SIMs for transmitting a message indicating the paging collision to a BS corresponding to the selected SIM.

For example, the UE may detect a first paging occasion associated with the first RAN, and detect a second paging occasion associated with the second RAN. In some embodiments of the present disclosure, the UE may transmit the message indicating the paging collision if the first paging occasion overlaps the second paging occasion. In some embodiments of the present disclosure, the UE may transmit the message indicating the paging collision if an interval between the time the first paging occasion transmitted and the time the second paging occasion begins to transmit is less than a threshold for paging collision.

In some embodiments of the present disclosure, the UE may receive a configuration message indicating the threshold for paging collision to configure the communication device from a certain BS (e.g., the first BS, the second BS, or both). Referring to FIG. 3, the UE 310 may receive, in operation 332, such configuration message. In some embodiments of the present disclosure, the threshold may be determined by the UE, for example, according to a certain standard protocol.

The threshold for paging collision may be configured per pair of frequency or band employed by the networks. For example, radio signals in the first RAN or the second RAN may be transmitted over one of 900 Mhz (F1), 1800 Mhz (F2), and 3 Ghz (F3). In the case that the first RAN employs 900 Mhz (F1), and the second RAN employs 1800 Mhz (F2), that is, the frequency pair is F1-F2, a threshold T1 may be configured. In the case that the first RAN employs 1800 Mhz (F2), and the second RAN employs 3 Ghz (F3), that is, the frequency pair is F2-F3, a threshold T2 different from or the same as T1 may be configured.

In some embodiments of the present disclosure, the UE may select one of the first SIM corresponding to the first RAN and the second SIM corresponding to the second RAN for transmitting the message indicating a paging collision.

In some embodiments of the present disclosure, the UE may select a SIM which is configured with a UE specific paging cycle for transmitting a message indicating a paging collision.

In some embodiments of the present disclosure, the UE may select a SIM used for transmitting a message indicating a paging collision based on a number of paging frames associated with the RANs, the numbers of paging occasions associated with the RANs, or both. In some embodiments, the UE may determine a number of paging frames within a paging cycle associated with each of the first RAN and the second RAN respectively, determine a number of paging occasions in a paging frame associated with each of the first radio access network and the second radio access network respectively, or both.

In one example, referring back to FIG. 1, the WCD 110a may determine a number of paging occasions (Ns1) in a paging frame within a paging cycle associated with one of the two RANs (e.g., the RAN 121a). If Ns1 is greater than 1, the WCD 110a may select the first SIM (corresponding to the RAN 121a) for transmitting the message indicating the paging collision. Otherwise, if Ns1 is equal to 1, the WCD 110a may determine a number of paging occasions (Ns2) in a paging frame within a paging cycle associated with the RAN 121b. If Ns2 is greater than 1, the WCD 110a may select the second SIM (corresponding to the RAN 121b) for transmitting the message indicating the paging collision.

For example, referring to FIG. 2A, a UE may determine that the number of paging occasions in a paging frame within a paging cycle associated with cell #1a is 2, and the number of paging occasions in a paging frame within a paging cycle associated with cell #2a is 1. The UE may select the SIM corresponding to cell #1a for transmitting the message indicating the paging collision.

In another example, referring back to FIG. 1, both Ns1 and Ns2 may be equal to 1. The WCD 110a may determine a number of paging frames (N1) within a paging cycle associated with one of the two RANs (e.g., the RAN 121a). If N1 is greater than 1, the WCD 110a may select the first SIM (corresponding to the RAN 121a) for transmitting a message indicating a paging collision. Otherwise, if N1 is equal to 1, the WCD 110a may determine a number of paging frames (N2) within a paging cycle associated with the RAN 121b. If N2 is greater than 1, the WCD 110a may select the second SIM (corresponding to the RAN 121b) for transmitting a message indicating a paging collision.

In yet another example, both (N1 or Ns1) and (N2 or Ns2) may be greater than 1, the WCD 110a may randomly select one of the first SIM and second SIM for transmitting a message indicating a paging collision.

In yet another example, all of the N1, Ns1, N2 and Ns2 may be equal to 1, the WCD 110a may randomly select one of the first SIM and second SIM for transmitting a message indicating a paging collision.

Referring to FIG. 3, in operation 336, UE 310 may select a first SIM for transmitting a message indicating a paging collision. In operation 338, the UE 310 may transmit a preamble for random access to a first BS (e.g., BS 320) in response to the paging collision at the UE 310 by virtue of the subscription service supported by the first SIM. In response to the random access preamble, the BS 320 may transmit, in operation 340, a Random Access Response (RAR) message including an uplink grant to the UE 310. In operation 342, the UE 310 may transmit the message indicating the paging collision to the BS 320.

In some embodiments of the present disclosure, the UE 310 may transmit the message indicating the paging collision via Msg3 during the random access procedure. In some embodiments of the present disclosure, the UE 310 may transmit a message indicating a paging collision after a successful random access procedure.

In some embodiments of the present disclosure, a message indicating a paging collision may include a one-bit indicator for paging collision.

In some embodiments of the present disclosure, the message indicating a paging collision may include paging information associated with the unselected SIM(s). Referring back to FIG. 1, the WCD 110a may, for example, select the first SIM for transmitting a message indicating a paging collision. The message indicating a paging collision may include paging information associated with the second SIM.

In some embodiments of the present disclosure, paging information associated with unselected SIM(s) (e.g., a second SIM) may include: a paging cycle associated with the second SIM; a paging frame associated with the second SIM; a paging occasion associated with the second SIM; an interval or an overlap amount between a first paging occasion and a second paging occasion; or any combination thereof. In some embodiments, the paging cycle associated with the second SIM may be the minimum of the RAN paging cycle, the UE specific paging cycle, and the default paging cycle associated with the second SIM.

In some embodiments of the present disclosure, a paging information associated with an unselected SIM(s) (e.g., a second SIM) may further include: a RAN paging cycle associated with the selected SIM (e.g., the first SIM), a default paging cycle associated with the first SIM, or both.

Referring to FIG. 3, in operation 348, the BS 320 may transmit configuration information to the UE 310 in response to the message indicating the paging collision.

In some embodiments of the present disclosure, the configuration information may include an acknowledgement in response to the message indicating the paging collision. The UE 310 may determine, based on a predetermined identity (e.g., UE_ID=0), an updated paging frame associated with the selected SIM (e.g., the first SIM), an updated paging occasion associated with the first SIM, or both. The predetermined identity may be specified in a corresponding communication standard protocol.

In some embodiments of the present disclosure, the configuration information may include an offset for a paging frame (PF_offset) associated with the UE 310. In these embodiments, Eq (1), as described above for determining the SPN for the paging frame, may be modified as follows:

$$(SFN+PF\_offset) \bmod T = (T \operatorname{div} N)*(UE\_ID \bmod N) \quad \text{Eq (1')}$$

In some embodiments of the present disclosure, the configuration information may include a specific paging occasion for monitoring a paging message, a specific paging frame for monitoring the paging message, or both.

In some embodiments of the present disclosure, the BS 320 may determine the specific paging occasion, the specific paging frame, or both for the UE 310 such that the paging messages are evenly distributed over available radio resources.

In some embodiments of the present disclosure, if a paging frame includes more than one paging occasion, the BS 320 may configure the UE 310 to use a different paging occasion (e.g., the one subsequent to the current paging occasion) in the same paging frame for monitoring paging.

In some embodiments, if the number of paging occasions (Ns) in a paging frame is greater than 1, or if the number of paging occasions in a paging cycle (nB) is greater than the paging cycle of the UE 310 (T), the BS 320 may configure the UE 310 to use the next paging occasion subsequent to the current paging occasion in the same paging frame for monitoring the paging. For example, referring back to FIG. 2A, UE may be configured to listen for a paging message from the cell #1a on paging occasion 211a-2, instead of paging occasion 211a-1.

Referring to FIG. 3, in some embodiments of the present disclosure, if Ns is equal to 1 or nB is equal to or less than T, however, the number of paging frames (N) in a paging cycle is greater than 1, the BS 320 may configure the UE 310 to use a different paging frame (e.g., the one subsequent to the current paging frame) in the same paging cycle for monitoring the paging.

In some embodiments of the present disclosure, configuration information may include an updated identity associated with UE 310. For example, if both Ns and N are equal to 1 or if nB is equal to or less than T and N is equal to 1, the BS 320 may configure the UE 310 with the updated identity. The UE 310 may determine, based on the updated identity, an updated paging frame associated with the selected SIM (e.g., the first SIM), an updated paging occasion associated with the first SIM, or both. In some embodiments, this updated identity may be included in a paging message. The UE 310 may be aware that a paging message is addressed to it based on the paging message containing the updated identity.

In some embodiments of the present disclosure, BS 320 may transmit, in operation 352, the configuration information to the CN 330 (denoted by a dotted line). In some embodiments of the present disclosure, the BS 320 may not transmit the configuration information to the CN 330. For example, the BS 320 may transmit the configuration information to the MME or the AMF of the CN 330.

In some embodiments of the present disclosure, the BS 320 may transmit, in operation 344, a message indicating a paging collision to CN 330 (denoted by a dotted line). In these embodiments, the CN 330 (e.g., the MME or the AMF), instead of BS 320, may determine how to adjust paging configuration of the UE 310 to avoid the paging collision. In operation 346, the CN 330 may transmit configuration information to the BS 320 in response to the message indicating the paging collision (denoted by a dotted line). Then, BS 320 may forward the configuration information from CN 330 to the UE 310 in operation 348.

In some embodiments of the present disclosure, CN 330 may reconfigure UE specific paging cycle for UE 310 in response to receiving a message indicating a paging collision. The UE specific paging cycle may be then transmitted to the UE via a Non-Access Stratum (NAS) message. The CN 330 may also inform BS 320 of the updated UE specific paging cycle.

In some embodiments of the present disclosure, CN 330 may transmit an acknowledgement to UE 310 in response to a message indicating a paging collision. UE 310 may determine, based on a predetermined identity (e.g., UE_ID=0), an updated paging frame associated with the selected SIM (e.g., the first SIM), an updated paging occasion associated with the first SIM, or both. The predetermined identity may be specified in a corresponding communication standard protocol.

In some embodiments of the present disclosure, the configuration information may include a specific paging occasion for monitoring a paging message, a specific paging frame for monitoring the paging message, or both.

In some embodiments of the present disclosure, CN 330 may determine a specific paging occasion, a specific paging frame, or both for UE 310 such that paging messages are evenly distributed over available radio resources.

In some embodiments of the present disclosure, if a paging frame includes more than one paging occasion, CN 330 may configure UE 310 to use a different paging occasion (e.g., the one subsequent to the current paging occasion) in the same paging frame for monitoring paging. In some embodiments, if the number of paging occasions (Ns) in a paging frame is greater than 1, or if the number of paging occasions in a paging cycle (nB) is greater than the paging cycle of the UE 310 (T), i.e., nB>T, the CN 330 may configure the UE 310 to use the next paging occasion subsequent to the current paging occasion in the same paging frame for monitoring paging.

In some embodiments of the present disclosure, if Ns is equal to 1 or nB is equal to or less than T, however, the number of paging frames (N) in a paging cycle is greater than 1, the CN 330 may configure UE 310 to use a different paging frame (e.g., the one subsequent to the current paging frame) in the same paging cycle for monitoring paging.

In some embodiments of the present disclosure, configuration information may include an updated identity associated with UE 310. For example, if both Ns and N are equal to 1 or if nB is equal to or less than T and N is equal to 1, CN 330 may configure UE 310 with the updated identity. In another example, CN 330 may configure the UE 310 with the updated identity regardless of the value of Ns, N, nB, or T, to override the original (current) UE identity. In some embodiments of the present disclosure, the CN 330 may transmit the updated identity, as well as the current UE identity, to the BS 320.

The UE 310 may determine, based on the updated identity, an updated paging frame associated with the selected SIM (e.g., the first SIM), an updated paging occasion associated with the first SIM, or both. In some embodiments, this updated identity may be included in a paging message. The UE 310 may know whether a paging message is targeted at the UE 310 based on the updated identity.

In some embodiments of the present disclosure, UE 310 may determine, in operation 354, whether paging collision is solved or not. If the paging collision is not solved, UE 310 may, for example, retransmit the message indicating the paging collision via selected SIM (e.g., the first SIM). In another example, UE 310 may transmit a message indicating a paging collision via another SIM (one of the unselected SIM, e.g., the second SIM).

Figure 4:
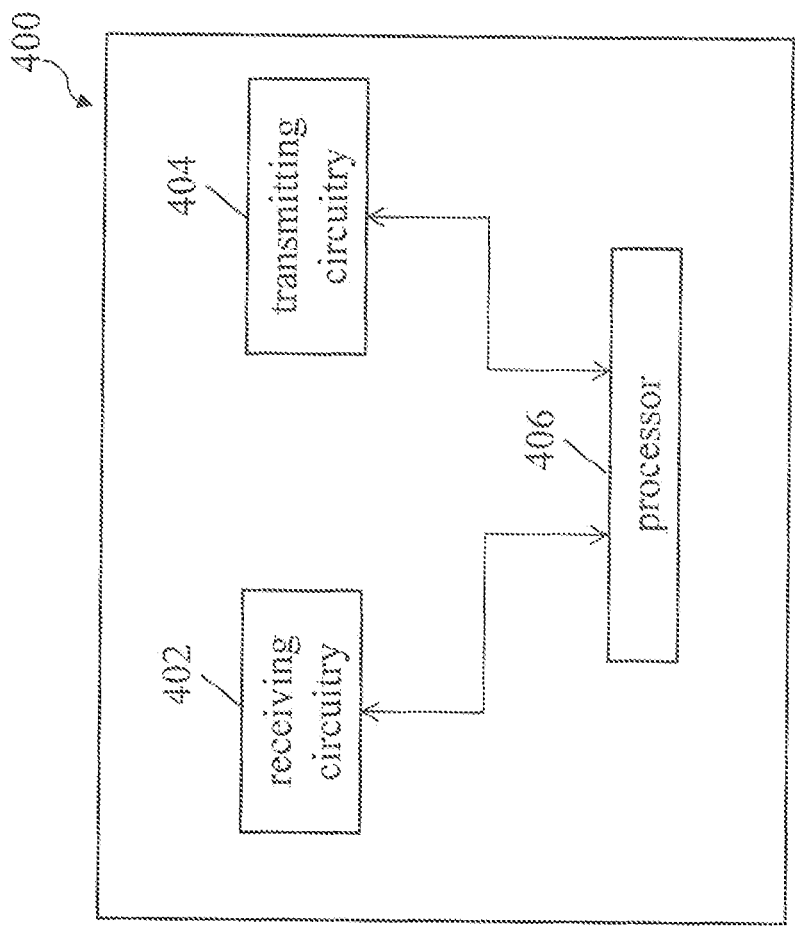
FIG. 4 illustrates an example block diagram of an apparatus according to some embodiments of the present disclosure.

FIG. 4 illustrates an example block diagram of an apparatus 400 according to some embodiments of the present disclosure.

As shown in FIG. 4, the apparatus 400 may include at least one non-transitory computer-readable medium (not illustrated in FIG. 4), a receiving circuitry 402, a transmitting circuitry 404, and a processor 406 coupled to the non-transitory computer-readable medium (not illustrated in FIG. 4), the receiving circuitry 402 and the transmitting circuitry 404. The apparatus 400 may be a BS, a CN component (e.g., a MME or an AMF), or a WCD (e.g., a UE).

Although in this figure, elements such as processor 406, transmitting circuitry 404, and receiving circuitry 402 are described in the singular, the plural is contemplated unless limitation to the singular is explicitly stated. In some embodiments of the present disclosure, the receiving circuitry 402 and the transmitting circuitry 404 are combined into a single device, such as a transceiver. In certain embodiments of the present disclosure, the apparatus 400 may further include an input device, a memory, and/or other components.

In some embodiments of the present disclosure, the non-transitory computer-readable medium may have stored thereon computer-executable instructions to cause a processor to implement the method with respect to the communication device as described above. For example, the computer-executable instructions, when executed, cause the processor 406 interacting with receiving circuitry 402 and transmitting circuitry 404, so as to perform the operations with respect to the WCDs depicted with respect to FIG. 1 and the UEs depicted with respect to FIGS. 2A, 2B and 3.

In some embodiments of the present disclosure, the non-transitory computer-readable medium may have stored thereon computer-executable instructions to cause a processor to implement the method with respect to the BS as described above. For example, the computer-executable instructions, when executed, cause the processor 406 interacting with receiving circuitry 402 and transmitting circuitry 404, so as to perform the operations with respect to the BSs depicted in FIGS. 1, 2A, 2B and 3.

In some embodiments of the present disclosure, the non-transitory computer-readable medium may have stored thereon computer-executable instructions to cause a processor to implement the method with respect to the CN components as described above. For example, the computer-executable instructions, when executed, cause the processor 406 interacting with receiving circuitry 402 and transmitting circuitry 404, so as to perform the operations with respect to the CN components depicted in FIGS. 1, 2A, 2B and 3.

Those having ordinary skill in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, a register, a hard disk, a removable disk, a CD-ROM, or any other form of storage medium known in the art. Additionally, in some aspects, the operations of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

The following is what is claimed:

1. A method performed by a user equipment (UE), the method comprising:
   detecting a first paging occasion associated with a first radio access network;
   detecting a second paging occasion associated with a second radio access network;
   selecting one of a first subscriber identity module corresponding to the first radio access network and a second subscriber identity module corresponding to the second radio access network;
   in response to the first paging occasion overlapping with the second paging occasion, transmitting a message indicating that a paging collision has occurred;
   receiving configuration information in response to the message indicating that the paging collision has occurred, the configuration information comprising an updated identity associated with the selected subscriber identity module, wherein the selected one of the first subscriber identity module corresponding to the first radio access network and the second subscriber identity module corresponding to the second radio access network is used for transmitting the message indicating the paging collision; and
   determining, based on the updated identity, an updated paging frame associated with the selected subscriber identity module, an updated paging occasion associated with the selected subscriber identity module, or a combination thereof.

2. The method of claim 1, further comprising receiving a message indicating a threshold for paging collision to configure the UE.

3. The method of claim 1, wherein selecting one of the first subscriber identity module and the second subscriber identity module comprises:
   determining a number of paging frames within a paging cycle associated with each of the first radio access network and the second radio access network respectively;
   determining a number of paging occasions in a paging frame associated with each of the first radio access network and the second radio access network respectively;
   or a combination thereof.

4. The method of claim 3, wherein the number of paging frames or the number of paging occasions associated with one of the first radio access network and the second radio access network corresponding to the selected subscriber identity module is greater than 1.

5. The method of claim 3, wherein selecting one of the first subscriber identity module and the second subscriber identity module comprises:
    randomly selecting one of the first subscriber identity module and the second subscriber identity module in response to the numbers of paging frames associated with the first radio access network and the second radio access network are greater than 1 or the numbers of paging occasions associated with the first radio access network and the second radio access network are greater than 1.

6. The method of claim 1, wherein the selected subscriber identity module is configured with a specific paging cycle.

7. The method of claim 1, wherein the message indicating that the paging collision has occurred includes a one-bit indicator for paging collision.

8. The method of claim 1, wherein the message indicating that the paging collision has occurred includes paging information associated with another one of the first subscriber identity module and the second subscriber identity module.

9. The method of claim 8, wherein the paging information associated with the another subscriber identity module includes:
    a paging cycle associated with the another subscriber identity module;
    the paging frame associated with the another subscriber identity module;
    the paging occasion associated with the another subscriber identity module;
    an interval or an overlap amount between the first paging occasion and the second paging occasion; or
    some combination thereof.

10. The method of claim 9, wherein the paging information further includes a radio access network paging cycle and a default paging cycle associated with the selected subscriber identity module.

11. The method of claim 1, wherein receiving the configuration information comprises:
    receiving an acknowledgement in response to the message indicating that the paging collision has occurred; and
    determining, based on a predetermined identity, an updated paging frame associated with the selected subscriber identity module, an updated paging occasion associated with the selected subscriber identity module, or a combination thereof.

12. The method of claim 1, further comprising receiving a paging message based on the updated identity.

13. A base station, comprising:
    at least one memory; and
    at least one processor coupled with the at least one memory and configured to cause the base station to:
        receive a message indicating that a paging collision has occurred at a user equipment (UE), wherein the message comprises a requested offset value for paging occasions, the message is received in response to a first paging occasion, associated with a first radio access network being detected, a second paging occasion associated with a second radio access network being detected, and the first paging occasion overlapping with the second paging occasion, and the message is transmitted by the UE using a selected one of a first subscriber identity module corresponding to the first radio access network and a second subscriber identity module corresponding to the second radio access network; and
        transmit configuration information in response to the message indicating the paging collision, wherein the configuration information comprises a configured offset for the paging occasions and an updated identity associated with the selected subscriber identity module, wherein the configuration information indicates a threshold for paging collision.

14. The base station of claim 13, wherein the at least one processor is configured to cause the base station to:
    transmit an acknowledgement in response to the message indicating the paging collision;
    transmit a specific paging occasion for monitoring a paging message, a specific paging frame for monitoring the paging message, or a combination thereof;
    transmit an updated identity associated with the communication device;
    or some combination thereof.

15. The base station of claim 14, wherein:
    in response to a number of paging occasions in a paging frame being greater than 1, the at least one processor is configured to cause the base station to transmit a specific paging occasion within the paging frame for monitoring the paging message;
    in response to the number of paging occasions being equal to 1 and the number of paging frames within a paging cycle being greater than 1, the at least one processor is configured to cause the base station to transmit a specific paging frame within the paging cycle for monitoring the paging message; and
    in response to both the number of paging occasions and the number of paging frames being equal to 1, the at least one processor is configured to cause the base station to transmit the updated identity associated with the communication device.

16. A user equipment (UE), comprising:
    at least one memory; and
    at least one processor coupled with the at least one memory and configured to cause the UE to:
        detect a first paging occasion associated with a first radio access network;
        detect a second paging occasion associated with a second radio access network;
        select one of a first subscriber identity module corresponding to the first radio access network and a second subscriber identity module corresponding to the second radio access network;
        in response to the first paging occasion overlapping with the second paging occasion, transmit a message indicating that a paging collision has occurred;
        receive configuration information in response to the message indicating the paging collision has occurred, the configuration information comprising an updated identity associated with the selected subscriber identity module, wherein the selected one of the first subscriber identity module corresponding to the first radio access network and the second subscriber identity module corresponding to the second radio access network is used for transmitting the message indicating the paging collision; and
        determine, based on the updated identity, an updated paging frame associated with the selected subscriber identity module, an updated paging occasion associated with the selected subscriber identity module, or a combination thereof.

* * * * *